United States Patent
Kazmi et al.

(10) Patent No.: US 11,070,993 B2
(45) Date of Patent: *Jul. 20, 2021

(54) METHOD AND ARRANGEMENT IN A COMMUNICATION NETWORK

(71) Applicant: TELEFONAKTIEBOLAGET LM ERICSSON (PUBL), Stockholm (SE)

(72) Inventors: Muhammad Kazmi, Stockholm (SE); Robert Baldemair, Solna (SE); Rong Hu, Sollentuna (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 140 days.

This patent is subject to a terminal disclaimer.

(21) Appl. No.: 16/051,561

(22) Filed: Aug. 1, 2018

(65) Prior Publication Data

US 2018/0352458 A1 Dec. 6, 2018

Related U.S. Application Data

(63) Continuation of application No. 12/598,264, filed as application No. PCT/EP2008/003533 on Apr. 30, 2008, now Pat. No. 10,051,498.

(30) Foreign Application Priority Data

May 2, 2007 (SE) .................... 0701053-1

(51) Int. Cl.
*H04W 24/08* (2009.01)
*H04W 72/08* (2009.01)
*H04W 72/12* (2009.01)

(52) U.S. Cl.
CPC .......... *H04W 24/08* (2013.01); *H04W 72/085* (2013.01); *H04W 72/12* (2013.01)

(58) Field of Classification Search
CPC ... H04W 24/08; H04W 72/085; H04W 72/12; H04W 74/008; H04W 74/0833; H04W 74/0841; H04W 74/0866
See application file for complete search history.

(56) References Cited

U.S. PATENT DOCUMENTS 5,930,366 A 7/1999 Jamal et al.
5,974,327 A 10/1999 Agrawal et al.
(Continued)

FOREIGN PATENT DOCUMENTS

EP 1418778 A1 5/2004
EP 1653755 A1 5/2006
(Continued)

OTHER PUBLICATIONS

Ericsson, "Explicit Out of Coverage Reporting Mechanism in E-UTRAN," 3GPP TSG-RAN WG1 Meeting #50, Athens, Greece, Aug. 20-24, 2007, retrieved from the Internet: URL:http://www.3gpp.org/ftp/tsg_ran/WG1_RL1/TSGR1_50/Docs/R1-073747.zip, pp. 1-5, XP002493508.
(Continued)

*Primary Examiner* — Michael Thier
*Assistant Examiner* — Prince A Mensah
(74) *Attorney, Agent, or Firm* — Patent Portfolio Builders PLLC

(57) ABSTRACT

The present invention relates to methods, a user equipment and a radio base station in a communication network, in which a downlink out-of-coverage is detected based on measurements done on a common channel or on the combination of common and dedicated channels. The out-of-coverage is then reported to the network, either using resources proactively assigned to the user equipment, or by transmitting a predetermined pattern of signature sequences assigned to the user equipment.

24 Claims, 2 Drawing Sheets

(56) References Cited

U.S. PATENT DOCUMENTS

| | | | |
|---|---|---|---|
| 6,259,724 B1* | 7/2001 | Esmailzadeh | H04B 1/707 375/143 |
| 6,597,675 B1 | 7/2003 | Esmailzadeh et al. | |
| 7,450,943 B2 | 11/2008 | Black et al. | |
| 7,613,244 B2 | 11/2009 | Hwang et al. | |
| 10,051,498 B2 | 8/2018 | Kazmi et al. | |
| 2002/0111163 A1 | 8/2002 | Hamabe | |
| 2003/0134655 A1* | 7/2003 | Chen | H04W 52/322 455/522 |
| 2004/0063451 A1 | 4/2004 | Bonta et al. | |
| 2004/0157610 A1 | 8/2004 | Black et al. | |
| 2005/0054358 A1 | 3/2005 | Zhang et al. | |
| 2005/0117557 A1* | 6/2005 | Lakkis | H04B 1/71635 370/338 |
| 2005/0250524 A1 | 11/2005 | Nilsson et al. | |
| 2005/0271009 A1* | 12/2005 | Shirakabe | H04W 16/10 370/329 |
| 2006/0046661 A1 | 3/2006 | Ekvetchavit et al. | |
| 2006/0126570 A1 | 6/2006 | Kim et al. | |
| 2007/0026818 A1 | 2/2007 | Willins et al. | |
| 2007/0147310 A1 | 6/2007 | Cai | |
| 2007/0178930 A1* | 8/2007 | Xiao | H04W 52/346 455/522 |
| 2007/0184865 A1 | 8/2007 | Phan et al. | |
| 2007/0220151 A1* | 9/2007 | Li | H04L 5/0039 709/226 |
| 2007/0265002 A1 | 11/2007 | Machida et al. | |
| 2007/0291702 A1* | 12/2007 | Nanba | H04J 3/00 370/336 |
| 2008/0008212 A1 | 1/2008 | Wang et al. | |
| 2008/0043658 A1 | 2/2008 | Worrall | |
| 2008/0095185 A1 | 4/2008 | DiGirolamo et al. | |
| 2008/0176523 A1* | 7/2008 | Sutton | H04B 1/0475 455/76 |
| 2008/0176575 A1* | 7/2008 | Sutton | H04W 72/085 455/450 |
| 2008/0182579 A1 | 7/2008 | Wang et al. | |
| 2009/0011769 A1* | 1/2009 | Park | H04W 74/002 455/450 |
| 2009/0016278 A1 | 1/2009 | Wakabayashi | |

FOREIGN PATENT DOCUMENTS

| | | | |
|---|---|---|---|
| EP | 2140700 B1 | 4/2011 | |
| JP | 07135683 A | 5/1995 | |
| JP | 9261159 | 10/1997 | |
| JP | 2004129286 A | 4/2004 | |
| RU | 2232469 C2 | 7/2004 | |
| RU | 2233045 C2 | 7/2004 | |
| WO | 0019762 A1 | 4/2000 | |
| WO | 0054536 A1 | 9/2000 | |
| WO | 2005109672 A1 | 11/2005 | |
| WO | 2007052971 A1 | 5/2007 | |
| WO | 2008135231 A1 | 11/2008 | |

OTHER PUBLICATIONS

Extended European Search Report in related EP Application No. 10188002, dated Dec. 10, 2015(all documents have been previously cited in this U.S. application).

Final Office Action, dated May 23, 2013, from corresponding U.S. Appl. No. 12/598,264.

Holma, H., et al., "Chapter 6: Physical Layer," WCDMA for UMTS: Radio Access for Third Generation Mobile communications, Wiley and Sons, GB, Sep. 1, 2004, XP002493514, pp. 99-148.

International Preliminary Report on Patentability for PCT/EP2008/003533 dated Jul. 10, 2009.

International Search Report for PCT/EP2008/003533 dated Sep. 4, 2008.

IPwireless: "Layer 1 signalling based user detection for LTE MBMS," 3GPP Draft; R2-062271, 3rd Generation Partnership Project (3GPP), Mobile Competence Centre; 650, Route Des Lucioles; F-06921 Sophia-Antipolis Cedex, France, vol. RAN WG2, Meeting #54, Tallinn, Estonia; Aug. 28-Sep. 1, 2006, XP050131876.

Office Action for Related European Application No. 08 749 280.7 dated Jun. 30, 2010.

Office Action in corresponding Russian Application No. 2012117120/07(025897) dated May 30, 2016.

Office Action issued in corresponding European patent application No. 10 188 002.9-1249, dated Jan. 8, 2013.

Office Action, dated Aug. 31, 2012, from corresponding U.S. Appl. No. 12/598,264.

Office Action, dated Feb. 24, 2015, from corresponding U.S. Appl. No. 12/598,264.

Office Action, dated Jul. 8, 2014, from corresponding U.S. Appl. No. 12/598,264.

Office Action, dated Jun. 3, 2016, from corresponding U.S. Appl. No. 12/598,264.

Office Action, dated May 25, 2017, from corresponding U.S. Appl. No. 12/598,264.

Office Action, dated Nov. 13, 2017, from corresponding U.S. Appl. No. 12/598,264.

Panasonic; "Random Access Preamble signature usage"; 3GPP TSG RAN WG2 #57 bis; R2-071143; Mar. 26-30, 2007. [downloaded at http://www.3gpp.org/DynaReport/TDocExMtg--R2-57b--26245. htm].

Swedish Patent Office Communication in related Swedish Application No. 0701053-01, dated Oct. 31, 2007(the NPL document D2 was previously cited in this U.S. application).

Technical Specification, "Universal Mobile Telecommunications System (UMTS); Physical Layer procedures (FDD), 3GPP TS 25.214 Version 7.3.0, Release 7," ETSI TS 125 214, ETSI Standards, vol. 3-R1, No. V7.3.0., Dec. 1, 2006, XP014039970, pp. 1-62.

TSG-RAN Working Group 2 meeting #56bis; "intra-LTE handover procedure by using dedicated signature"; ZTE; R2-070029; Jan. 15-19, 2007; pp. 1-5; Sorrento, Italy. [downloaded at http://www.3gpp.org/ftp/tsg_ran/WG2_RL2/TSGR2_56bis/Documents//R2-070029.zip].

3GPP TSG RAN WG2 #57bis, LG Electronics, Samsung; "Use of dedicated RACH signatures"; R2-071455; Mar. 26-30, 2007; pp. 1-4; Mar. 26-30, 2007; St. Julian's, Malta.

3GPP, "3rd Generation Partnership Project; Technical Specification Group Radio Access Network; Physical Layer Aspects for Evolved Universal Terrestrial Radio Access (UTRA) (Release 7)," 3GPP TR 25.814 V7.1.0, Sep. 2006, XP002488576, pp. 1-49.

Decision on Grant in corresponding Russian Application No. 2012117120/07(025897) dated Jul. 14, 2016.

Decision to Grant issued in corresponding Russian application No. 209144534/07(063425), dated Sep. 27, 2012.

English Translation of Office Action received from Russian Federation in relation to corresponding International Application No. PCT/EP2008/003533 dated Feb. 17, 2012.

Korber, Martin; "Opposition against EP2 140 700 B1 of Telefonaktiebolaget L M Ericsson (Publ)" dated Jun. 10, 2011; 15 pages.

Office Action and Notice of Allowance in Japan Application No. 2010-504579 dated Feb. 28, 2013; 3 pages.

Yih, C.H., et al.; "Analysis of Cochannel Interference in Multi-Cell OFDM Networks," Ninth IEEE International Symposium on Personal, Indoor and Mobile Radio Communications; Sep. 8-11, 1998, pp. 544-548, Boston, MA.

* cited by examiner

METHOD AND ARRANGEMENT IN A COMMUNICATION NETWORK

This application is a continuation of U.S. patent application No. 12/598,264, filed Oct. 30, 2009, which is a National Stage of PCT Application No. PCT/EP2008/003533, filed Apr. 30, 2018, which claims priority from Swedish Patent Application Serial No. 0701053-1 filed May 2, 2007, the disclosure of which is incorporated here by reference.

TECHNICAL FIELD

The present invention relates to methods and arrangements in a communication network and more particularly to a downlink out-of-coverage detection and reporting of the out-of-coverage to the network.

BACKGROUND OF THE INVENTION

In E-UTRAN Orthogonal Frequency Division Multiple Access (OFDMA) technology is used in the downlink. OFDM is a modulation scheme in which the data to be transmitted is split into several sub-streams, where each sub-stream is modulated on a separate sub-carrier. Hence in OFDMA based systems, the available bandwidth is sub-divided into several resource blocks or units as defined, for example, in 3GPP TR 25.814: "Physical Layer Aspects for Evolved UTRA". According to this document, a resource block is defined in both time and frequency. According to the current assumptions, a resource block size is 180 KHz and 0.5 ms in frequency and time domains, respectively. The overall uplink and downlink transmission bandwidth is as large as 20 MHz.

Downlink Measurements in E-UTRAN

In E-UTRAN the user equipment (UE) is required to perform different types of measurements in order to facilitate many radio resource management (RRM) related tasks such as scheduling, handover, admission control, congestion control etc. Some typical downlink measurements carried out by the UE include channel quality indicator (CQI), carrier received signal strength indicator (carrier RSSI), reference signal received power (RSRP) etc. Some of these measurements are done on the reference symbols, which are transmitted at least once every 68 sub-carrier in the frequency domain. For instance, RSRP and CQI are measured over the reference symbols. Other common channels sent on the downlink in E-UTRAN include synchronization channel (SCH) and broadcast channel (BCH).

Some of these measurements especially RSRP, which is based on long term averaging, is used by the network for coverage triggered handover. In other words RSRP could provide information related to the cell coverage.

Packet Oriented Transmission in E-UTRAN

The E-UTRAN is a packet oriented system, where all type of uplink and downlink transmission including data and signalling takes place via shared channel. The network has the full control over the radio and network resources or the so-called scheduling grants (e.g. resource blocks, modulation, coding, sub-frames etc), which are assigned to the UE on demand basis. However, it might be possible, partly or fully, to pre-assign limited amount of resources to the UE for certain type of critical periodic measurement reports.

RACH Transmission in E-UTRAN

Random access in E-UTRAN is based on a two-step procedure. In the first step the UE transmits a randomly selected signature to the network. In the subsequent procedure the network responds to the UE with an uplink scheduling grant which is used by the UE to transmit further details related to the connection request.

The transmitted sequence is randomly chosen out of an available pool of 64 unique sequences. If the UE does not receive an uplink scheduling grant within a certain time it randomly selects a new signature sequence and performs a new random access (RA) attempt.

The time-frequency resources where random access may be performed are announced via system information. One random access opportunity (or resource) is 1.08 MHz wide (6 resource blocks, each comprised of 180 kHz in the frequency domain) and lasts for 1 ms. Multiple RA opportunities may be spread out over frequency. It is up to the network whether to schedule other data in a RA slot or not. The network thus also controls whether RA transmission is orthogonal to shared data transmission or not.

Out-of-Coverage Concept

An explicit out of coverage concept is not specified. However, similar concept called out of sync is used in the WCDMA. In WCDMA the downlink power control is mandatory. This means the base station adjusts its downlink transmitted power in response to the power control commands (TPC) sent by the UE. In case of out of sync situation there is a risk that excessive power up commands may saturate the base station downlink transmitted power. Thus the main purpose of out of sync in WCDMA is to protect the base station from transmitting unnecessary high power. In other words when out of sync is reported the base station disables the UE connection or at least simply ignore the received TPC commands from the UE. The general concept of out of sync concept is described below.

The UE monitors downlink channel quality on a suitable measurement signal (e.g. reference or pilot signals). If the estimated downlink quality remains below an acceptable quality limit (Qout) over time period (Tout) then the UE reports out-of-coverage to its higher layers (e.g. layer-3 or RRC) through an out-of-coverage primitive. Subsequently UE higher layers indicate to the RRC in the network (e.g. RNC) that the UE physical layer has detected out-of-coverage. The network then takes an appropriate measure such as change downlink power offsets, handover, congestion control etc.

Since the downlink radio condition improves, hence the UE also needs to monitor downlink channel quality when in the state of out-of-coverage. In this situation if the UE detects that the estimated downlink quality has become greater than another threshold ($Q_{in}$) over time period $T_{in}$, then the UE reports in-coverage to its higher layers through primitive. Subsequently the UE higher layers inform the network that its physical layer has detected in-coverage.

Out of Sync Concept in WCDMA

As stated above no explicit out-of-coverage concept is specified. However, similar concept called out-of-sync reporting procedure is used in WCDMA to protect the base station transmitted from transmitting unnecessary high power.

In WCDMA downlink out-of-sync is specified in the specification document 3GPP 25.214 "Physical Layer Procedures" and is briefly described as follows:

The UE estimates downlink channel quality, which is expressed as transmit power control (TPC) command error rate. If the downlink quality is below specified level ($Q_{out}$) over $T_{out}$ the UE reports out-of-sync. Typically out of sync is reported to the network by the UE if the downlink measured quality in terms of TPC command error rate exceeds 30% over 160 ms measurement interval.

Since TPC commands are sent on DPCCH or F-DPCH, therefore the out of sync criteria is based on the dedicated channel, i.e. on UE specific channel. An overview of the out of sync procedure in WCDMA is depicted in FIG. 1.

Scenarios for Out of Coverage in E-UTRAN

In this section we described some important scenarios or situations where explicit coverage loss indication is needed by the network. Some examples of such scenarios are:

E-UTRAN coverage border

Poor coverage at the junction of irregular cell sizes

Coverage Border Scenario:

Limited E-UTRAN coverage in some geographical vicinity may result in coverage boundaries. This may easily lead to a situation where a UE loses coverage when moving out of the E-UTRAN coverage borders. An explicit coverage loss Indication in this scenario would make the network aware of the UE coverage status more clearly. This could help the network to improve the coverage, if possible, by employing suitable radio resource management technique. On the other hand, a consistent coverage loss as depicted by the coverage loss criteria could allow the network to drop such a UE well in time thereby saving network resources.

Poor Coverage Areas:

E-UTRAN like any other cellular network is expected to offer ubiquitous coverage in all types of locations. However, there are at least some inevitable coverage spots, where good cell planning is very hard to realize in practice. These areas could be found at the intersection of very irregular cell sizes e.g. cells encompassing hilly and skyscrapers within a congested metropolitan region. Consistently ensuring good coverage in such awkward coverage spots could drain enormous network radio resources. However, an efficient radio resource management mechanism could react and improve the coverage on demand basis by allocating more resources etc. The realization of such a mechanism requires explicit UE feedback when its coverage falls below the desired level.

Limitation of Implicit Coverage Loss Indication

The UE reported measurements such as RSRP in E-UTRAN may implicitly depict the coverage status of the UE. However, any measurement including RSRP is limited to a certain minimum reporting value, e.g. up to −140 dBm. However, in such out of coverage scenarios the measured quantity (e.g. RSRP) is likely to be out of the reporting range, i.e. much lower than the minimum reportable value. In case the reported range is further extended (e.g. below −140 dBm), the measured results at lower ranges would obviously incorporate very large measurement uncertainties. This is because at low measured quantity the uncertainty becomes larger rendering the reported value highly unreliable. Hence in these circumstances, solely based on the UE measurement reports, the network may not correctly infer that the UE is out of coverage or not.

Coverage Indication Via Dedicated Connection

In out of coverage or out of sync scenario the downlink connection (from base station to UE) becomes unreliable. In WCDMA, where a dedicated connection is maintained, the UE is still able to send out of sync indication on the uplink despite the downlink remains unreachable. In E-UTRAN only shared channel is used for uplink and downlink transmission, where resources are allocated by the network on demand basis. It is thus unlikely that UE in E-UTRAN will be able to correctly receive any scheduling grant or resource allocation from the network in out of coverage situation. Thus the current WCDMA approach is less likely to work in E-UTRAN.

Coverage Loss Criteria Based on Dedicated Reference Signals

The existing out-of-sync procedure in UTRAN takes into account only the DPCCH or F-DPCH when estimating the downlink channel quality. As a consequence the downlink channel quality estimate is done on dedicated pilot bits and/or TPC commands.

However, it has been evaluated that downlink channel quality estimate based on both dedicated and common pilots leads to better out-of-sync detection by the UE. The possible reason is that dedicated reference signals or pilots used in WCDMA are power controlled that does not provide the actual coverage status of the UE. The aspect of using the common reference signals to detect out-of-sync or out-of-coverage is not used in the existing system.

SUMMARY OF THE INVENTION

In the preferred embodiment the downlink out of coverage detection is based on measurement done on some common channels such as BCH, common reference signals, synchronization signals or combinations thereof. In another embodiment it's based on the combination of any set of common reference signals and dedicated reference signals.

The out of coverage is reported to the network in a number of ways. It is indicated: By sending a unique pattern of signature sequences on RACH channel.

By proactively allocating resources when certain UE reported measurement(s) is at minimum level; or By defining out of coverage indicator in one or more of the UE measurement reports.

Thanks to the provision of the inventive methods following advantages will be obtained:

Explicit downlink out-of-coverage reporting would allow the network to improve the coverage by taking appropriate action, e.g. handover, congestion control etc.

On the other hand it would help network to save resources if coverage cannot be improved.

It will improve network planning and dimensioning.

The UE is able to report out of coverage without the need for requesting uplink scheduling grants or resource assignment.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 1:
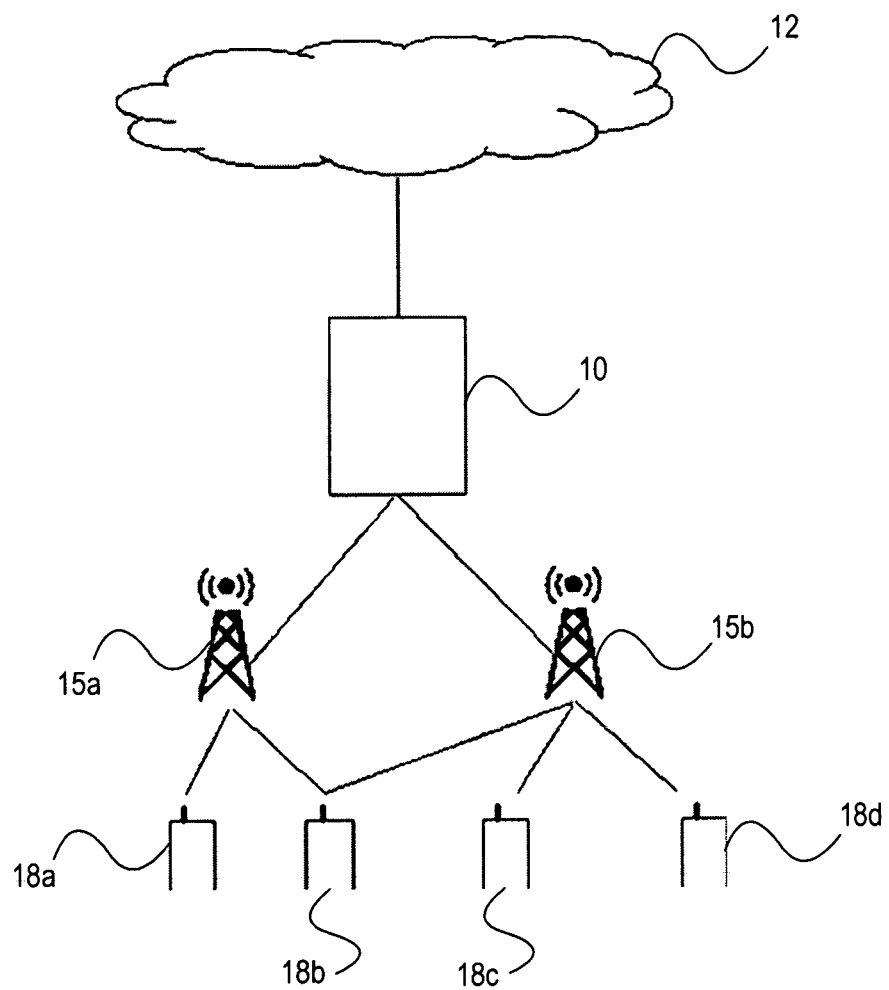
FIG. 1 shows an example of a communication network architecture.

FIG. 1 depicts a communication system, such as a OFDM system or a WCDMA system, including a Radio Access Network (RAN), such as the evolved UMTS Terrestrial Radio Access Network (E-UTRAN) architecture, comprising at least one Radio Base Station (RBS) (or Node B) 15a-b, connected to one or more Radio Network Controllers (RNCs) 10 (only one shown in FIG. 1). The RAN is connected over an interface such as the Iu-interface to a Core network (CN) 12, which may be a connection-oriented external CN such as the Public Switched Telephone Network (PSTN) or the integrated Services Digital Network (ISDN), and/or a connectionless external CN as the Internet.

The RAN and the CN 12 provide communication and control for a plurality of user equipments (UE) 18a-d. The UEs 18 each uses downlink (DL) channels (i.e. base-to-user or forward) and uplink (UL) channels (i.e. user-to-base or reverse) to communicate with at least one RBS 15 over a radio or air interface.

According to a preferred embodiment of the present invention, the communication system is herein described as a WCDMA communication system. The skilled person, however, realizes that the inventive method and arrangement works very well on all communications system. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

There are two main aspects of the invention:
Out of coverage detection
Out of coverage reporting
Out-of-Coverage Detection The downlink out-of-coverage detection is either based on common channel or combination of common and dedicated channels. Hence the following two categories of out-of-sync reporting procedures are discussed:
Detection based on common channel
Detection based on combined common and dedicated channels Detection Based on Common Channel In E-UTRAN some examples of common reference signals or channels are:
Downlink reference signals
Primary and/or secondary SCH channel
Primary BCH channel The UE should consistently measure and evaluate the coverage loss criteria over a specified time period. For example the out of coverage could occur when one or more of these quantities fall below a desired threshold over a time period ($T_{1,out}$):
Reference signal (RS) SINR or signal strength
SCH SINR or signal strength
Combined RS and SCH SINR or signal strength
BCH BLER
BER or symbol error rate The UE would also report in coverage (i.e., when downlink coverage becomes acceptable) when any one or more of the above measured quantities would become greater than another threshold during certain time period ($T_{1,in}$).

The above description is expressed in algorithmic form in the following sections:
Out-of-Coverage Procedure:
UE reports out-of-coverage based on the following algorithm:
$\rho$=DL quality estimated by UE on common channel.

Start:
IF ($\rho<\rho_{out}$) over period $T_{1,out}$
   UE reports out-of-coverage
ELSE
   Go to Start.
In-Coverage Procedure:

The precondition for in-coverage reporting is that UE went to out-of-coverage state from in-coverage (based on common channel).
Start:
IF ($\rho>\rho_{in}$) over period $T_{1,in}$
   UE reports in-coverage
ELSE
   Go to Start.
Out of Coverage Based on Existing UE Measurements:

Since some UE reported neighbour cell measurements (e.g. RSRP) are based on reference signals, therefore another possibility is to define out of coverage occurs when the measured quantity is below the minimum reportable value by certain threshold ($\Psi$). As an example the out of coverage will occur if the following condition is satisfied during time period ($T_{1,out}$):

$$RSRP_{measured} < RSRP_{min} - \Psi_1 \quad (1)$$

Similarly, the in coverage would occur when the following condition is satisfied during certain time period ($T_{1,in}$):

$$RSRP_{measured} < RSRP_{min} - \Psi_2 \quad (2)$$

Detection Based on Combined Common and Dedicated Channels

This procedure is applicable in case measurements are jointly based on dedicated and common channels for defining the out of coverage indication criteria. The basic principle is that in this mode out-of-coverage and in-coverage reporting is based on the downlink channel quality, which in turn is estimated on both common and dedicated pilots or on reference signals.

The dedicated pilot may also represent a power control command sent on the downlink by the base station to run uplink power control. The main point is that dedicated pilot means any sequence of signals known a priori to the receiver.

Both out-of-coverage and in-coverage schemes are given below:
Out-of-Coverage Schemes:

Following two out-of-coverage reporting schemes are proposed in dedicated mode:
Scheme 1 (Step-Wise):
$\gamma$=DL quality estimated (e.g. SINR or signal strength) by UE on dedicated reference signal.
$\phi$=DL quality estimated (e.g. SINR or signal strength) by UE on common reference signal.
Start:
IF ($\gamma<\gamma_{out}$) over period $T_{2,out}$
   IF ($\phi<\phi_{out}$) AND ($\gamma<\gamma_{out}$) over period $T_{3,out}$
   UE reports out-of-coverage
   ELSE
   Go to Start.
Scheme 2 (Combined):
$\beta$=Relative DL channel quality based on common and dedicated reference signals e.g. $\beta$ could be the ratio of received power on common reference signal to dedicated reference signal.

Start:
IF ($\beta<\beta_{out}$) over period $T_{4,out}$
    UE reports out-of-coverage
ELSE
    Go to Start.

Methods to Report Out-of-Coverage

Reporting on RACH

As mentioned earlier that in out of coverage situation the downlink quality is considerably bad that could prevent the network from assigning any scheduled resources to the UE for uplink transmission. Thus, one possibility is that UE utilizes RACH channel to report the explicit out of coverage to the network. The following method could be used on RACH channel:

By sending unique sequence pattern

Figure 3:
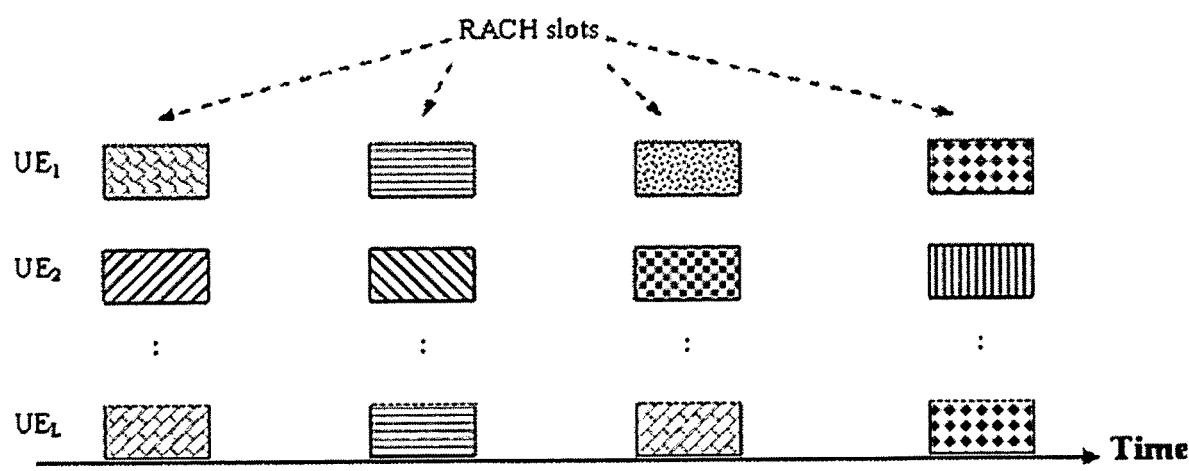
FIG. 3: Out of coverage indication by unique pattern of signature sequences in time.

Indication by unique sequence pattern on RACH (shown in FIG. 3)

Figure 2:
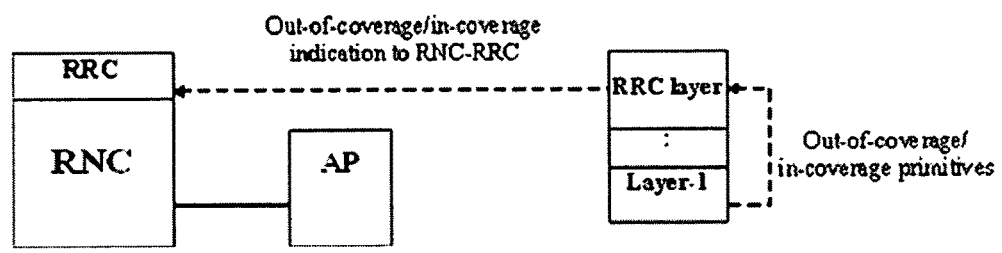
FIG. 2: Out-of-coverage and in-coverage reporting principle.

A UE will report out of coverage to the network by sending a unique (i.e. UE specific) pattern of the signature sequences on RACH channel in the same slots where normal RACH is transmitted. The pattern shall be comprised of more than one signature sequences, which could be transmitted either in consecutive RACH time slots or each sequence in the pattern could be transmitted in every $N^{th}$ RACH time slot as shown in FIG. 2. In case multiple RACH slots are defined over frequency the transmission of the out-of-coverage report may also utilize this degree of freedom. That means transmission of the pattern would be slowed in certain time-frequency resource.

Two or more sequences in a pattern may be the same. Secondly the pattern could either use the same signature sequences as used for the normal RACH transmission or they could be reserved for out of coverage reporting. The preferred solution is to be able to use all sequences for both normal RACH transmission and out of coverage reporting.

Let there be K unique signature sequences and M sequence per pattern. Then the total number of available unique pattern would be given by $K^M$. In case K=64, M=4, the total number of unique patterns would be $2^{24}$, which is sufficient for all the UE operating in a large coverage area.

Derivation of Pattern:

The UE shall derive its unique pattern by a suitable well specified hashing function. As an example the hashing of the UE identifier (e.g. IMSI or TMSI) could map the UE identity on one of the pattern. In this way the UE does not have to explicitly report its UE identity. In fact by decoding the pattern, the network shall be able to uniquely identify the UE that has reported the out of coverage.

Another possibility is that network explicitly signals the index of the pattern to the UE at the time of cell selection. The index is updated whenever UE reselects a new cell or after handover.

When downlink coverage improves the UE reports the in coverage in a normal way that is on a shared channel following the normal resource allocation procedure.

In order to avoid that the network considers a UE that is in coverage and performs regular RACH and by chance selects for its subsequent transmission attempts a valid out-of-coverage pattern the network combines multiple information it has about a UE before declaring a UE out-of-coverage. Such information could among other include recently reported RRM measurements.

Another possibility is to restrict certain patterns of signature sequences to the purpose of out-of-coverage reporting. These patterns must not be used for regular RACH attempts by any UE.

Proactive Assignment of Resources

The UE could still report out of coverage on uplink shared channel using higher layer signaling (e.g. RRC) provided the network proactively assign the resources to the UE. The network proactively assigns the resources for uplink transmission when it notices that downlink coverage as indicated by one or more UE measurement reports, is significantly poor such as lowest reportable SINR, RSRP etc.

The UE will then be able to report the out of coverage using the proactively assigned resources without the need for requesting any new uplink scheduling grants.

Using the above assigned resources UE either reports the out of coverage in any of the following way:

Using RRC (layer-3) message or

As part of the normal measurement report using out of coverage indicator

In the latter method an extra reported value beyond the normal measurement reporting range is to be specified.

RACH Unique Pattern for Other Applications

The idea of sending a unique pattern using RACH is also used for reporting any other critical information in situation when UE does not have or could not get UL scheduling grant. Thus, in use of this method, the radio base station signals a plurality of patterns of signature sequences to a user equipment, each pattern of signature sequences being associated with a respective critical condition relating to operation of the user equipment. The user equipment receives the signalled patterns of signature sequences and then, on detection of one of the critical conditions, the user equipment transmits the relevant pattern of signature sequences on the RACH. The radio base station then receives one of the patterns of signature sequences from the user equipment on the random access channel (RACH); and determines that the user equipment is in the critical condition associated with the received pattern. The radio base station can then take appropriate action. Examples of critical conditions are: UE running out of battery, subscriber in emergency situation, etc.

In the former situation, the network can move the UE from continuous reception mode to the discontinuous reception mode, which is significantly more power efficient. In this way, the UE can extend its battery life and stay active longer. In case of repeated reporting of this critical condition, the network can progressively extend the DRX cycle unless maximum DRX is reached. In a E-UTRAN system, the DRX cycle in RRC connected mode (i.e. the active mode when the UE can receive data) is between 2 ms and 2560 ms.

In the situation where the subscriber is in an emergency situation, the unique pattern can be sent in response to the subscriber pressing a special key on the UE. The lower layer which receives the unique pattern at the base station will report the emergency situation to the higher layers and eventually to the application layer, which will act accordingly.

The invention claimed is:

1. A method in a radio base station of transmitting one or more common channels, said radio base station comprises means for receiving and detecting a random access channel, means for receiving measurement reports and means for assigning radio resources or scheduling grant to a user equipment, wherein the method comprises the steps of:

signalling a unique pattern of more than one signature sequences, to be used for reporting out of coverage, to the user equipment (UE); and receiving the unique pattern of more than one signature sequences on said random access channel (RACH), from the UE when the UE is reporting out of coverage; and interpreting the received unique pattern of more than one signature sequences to determine that said user equipment is out of coverage.

2. The method according to claim 1, wherein the serving cell signals the unique pattern to the UE via system information on a broadcast channel (BCH).

3. The method according to claim 1, wherein the unique pattern is signalled to the UE via a shared channel on a UE specific channel.

4. The method according to claim 1, wherein by receiving the unique pattern of more than one signature sequences on RACH, the radio base station identifies the user equipment that is out of coverage.

5. The method according to claim 4, wherein the radio base station utilizes additional available UE measurement reports to verify the out-of- coverage situations of the user equipment.

6. The method according to claim 1, wherein the unique pattern of more than one signature sequences are only allowed for out of coverage reporting.

7. The method according to claim 1, wherein the unique pattern uses signature sequences, which are shared among normal RACH transmission and out of coverage reporting.

8. A radio base station for transmitting one or more common channels, comprising means for receiving and detecting a random access channel, means for receiving measurement reports and means for assigning radio resources or scheduling grant to a user equipment, wherein the radio base station further comprises:

means for signalling a unique pattern of than one signature sequences, to be used for reporting out of coverage, to the user equipment (UE);

means for receiving the unique pattern of more than one signature sequences on said random access channel (RACH), from the UE when the UE is reporting out of coverage; and means for interpreting the received unique pattern of more than one signature sequences to determine that said user equipment is out of coverage.

9. A method, for use in a radio base station, wherein the method comprises the steps of:

signalling a unique pattern of more than one signature sequences, to be used for reporting out of coverage, to a user equipment;

receiving the unique pattern of more than one signature sequences from the user equipment on a random access channel (RACH), from the UE when the UE is reporting out of coverage; and determining in response to the received unique pattern of more than one signature sequences that the user equipment is out of coverage.

10. The method according to claim 9, comprising signalling the unique pattern to the UE via system information on a broadcast channel (BCH).

11. The method according to claim 9, comprising signalling the unique pattern to the UE via a shared channel on a UE specific channel.

12. The method according to claim 9, wherein by receiving the unique pattern of more than one signature sequences on the RACH, the radio base station identifies the user equipment that is out of coverage.

13. The method according to claim 12, wherein the radio base station utilizes additional available UE measurement reports to verify the out-of- coverage situations of the user equipment.

14. The method according to claim 9, wherein the unique pattern of more than one signature sequences are only allowed for out of coverage reporting.

15. The method according to claim 9, wherein the unique pattern uses signature sequences, which are shared among normal RACH transmission and out of coverage reporting.

16. A radio base station, being adapted to:

signal a unique pattern of more than one signature sequences, to be used for reporting out of coverage, to a user equipment;

receive the unique pattern of more than one signature sequences from the user equipment on a random access channel (RACH), from the UE when the UE is reporting out of coverage; and determine in response to the received unique pattern of more than one signature sequences that the user equipment is out of coverage.

17. A method, for use in a radio base station, wherein the method comprises the steps of:

signalling a plurality of unique patterns of more than one signature sequences to a user equipment, each unique pattern of more than one signature sequences representing a specific critical condition relating to operation of the user equipment (UE);

receiving one of the unique patterns of more than one signature sequences from the user equipment on a random access channel (RACH) from the UE when the UE is in the specific critical condition; and determining, in response to the receiving the one of the unique patterns of more than one signature sequences, that the user equipment is in the specific critical condition associated with the received unique pattern.

18. The method as claimed in claim 17, wherein the step of signalling the plurality of unique patterns of more than one signature sequences to the user equipment, comprises signalling a plurality of indices that can be used by the user equipment to derive the respective signature sequences.

19. A radio base station, being adapted to:

signal a plurality of unique patterns of more than one signature sequences to a user equipment, each unique pattern of more than one signature sequence representing a specific critical condition relating to operation of the user equipment (UE);

receive one of the unique patterns of more than one signature sequences from the user equipment on a random access channel (RACH) from the UE when the UE is in the specific critical condition; and determine, in response to the received unique pattern of more than one signature sequences, that the user equipment is in the specific critical condition associated with the received unique pattern.

20. The radio base station as claimed in claim 19, being adapted to signal the plurality of unique patterns of more than one signature sequences to the user equipment by signalling a plurality of indices that can be used by the user equipment to derive the respective more than one signature sequences.

21. A method, for use in a user equipment, wherein the method comprises the steps of:

receiving from a radio base station a plurality of unique patterns of more than one signature sequences, each unique pattern of more than one signature sequences representing a specific critical condition relating to operation of the user equipment;

determining that one of said specific critical conditions applies; and transmitting one of the unique patterns of more than one signature sequences, associated with the specific critical condition, on a random access channel (RACH).

22. The method as claimed in claim 21, wherein the step of receiving from the radio base station the plurality of unique patterns of more than one signature sequences comprises receiving a plurality of indices and using the received indices to derive the respective more than one signature sequences.

23. A user equipment, adapted to:

receive from a radio base station a plurality of unique patterns of more than one signature sequences, each unique pattern of more than one signature sequences representing a specific critical condition relating to operation of the user equipment;

determine that one of said specific critical conditions applies; and transmit one of the unique patterns of more than one signature sequences, associated with the specific critical condition, on a random access channel (RACH).

24. The user equipment as claimed in claim 23, adapted to receive from the radio base station the plurality of unique patterns of more than one signature sequences by receiving a plurality of indices and using the received indices to derive the respective more than one signature sequences.

\* \* \* \* \*